US012760658B2

(12) United States Patent
Hoyt et al.

(10) Patent No.: US 12,760,658 B2
(45) Date of Patent: Oct. 13, 2026

(54) VARIABLE VANE LEVER ARM

(71) Applicant: RTX Corporation, Farmington, CT (US)

(72) Inventors: Samuel B. Hoyt, Farmington, CT (US); Fadi Samir Maalouf, East Hampton, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/041,823

(22) Filed: Jan. 30, 2025

(65) Prior Publication Data

US 2026/0218624 A1 Jul. 30, 2026

(51) Int. Cl.
*F01D 17/16* (2006.01)
*F01D 9/04* (2006.01)

(52) U.S. Cl.
CPC ........... *F01D 17/165* (2013.01); *F01D 9/041* (2013.01); *F05D 2260/50* (2013.01)

(58) Field of Classification Search
CPC ........ F01D 17/14; F01D 17/148; F01D 17/16; F01D 17/162; F01D 17/165; F01D 9/041; F05D 2240/12
See application file for complete search history.

(56) References Cited

U.S. PATENT DOCUMENTS 4,363,600 A * 12/1982 Thebert ................. F01D 17/162 415/140
4,668,165 A 5/1987 Ludwick
7,011,494 B2 * 3/2006 Kies ...................... F04D 29/563 415/149.1
7,182,571 B2 * 2/2007 Selby .................. F04D 27/0246 74/519
7,198,461 B2 4/2007 Burgmeier et al.
7,223,066 B2 5/2007 Rockley
8,215,902 B2 * 7/2012 Major ................... F01D 17/162 29/889.22
8,414,248 B2 * 4/2013 Perez .................... F04D 29/644 415/163
10,161,260 B2 * 12/2018 Morganti .................. F02C 7/36
10,208,618 B2 * 2/2019 Gasmen ................ F01D 17/162
(Continued)

FOREIGN PATENT DOCUMENTS

FR 2877059 A1 4/2006

OTHER PUBLICATIONS

Office Action dated Jul. 24, 2025 for U.S. Appl. No. 19/041,827.

*Primary Examiner* — Brian P Wolcott
(74) *Attorney, Agent, or Firm* — Bachman & LaPointe, P.C.

(57) ABSTRACT

A vane arm has first and second holes in its shank proximate first and second ends. First and second tabs each project laterally opposite each other from the shank proximate the second end and have: a bend; and a distal portion distally of the bend. The second tab distal portion partially overlaps the first tab distal portion. A third hole is in the second tab distal portion overlapping a distal end edge of the first tab and having a proximal edge and a distal edge. At least along a region across an axis of the second hole, the third hole distal edge and proximal edge diverge from each other in a direction toward the first end and/or the first tab distal end edge and the third hole proximal edge diverge from each other in a direction toward the first end.

20 Claims, 8 Drawing Sheets

(56) References Cited

U.S. PATENT DOCUMENTS

| | | | | |
|---|---|---|---|---|
| 10,393,145 | B2 | 8/2019 | Medina Cruz et al. | |
| 10,830,090 | B2 * | 11/2020 | Mairhanser | F01D 17/20 |
| 11,255,217 | B2 * | 2/2022 | Landry | F01D 17/162 |
| 11,391,174 | B2 * | 7/2022 | Little | F01D 9/042 |
| 11,421,540 | B2 * | 8/2022 | Little | F04D 29/563 |
| 2015/0354401 | A1 * | 12/2015 | Morganti | F04D 29/563 415/160 |
| 2016/0032759 | A1 | 2/2016 | Gasmen et al. | |
| 2018/0163560 | A1 * | 6/2018 | Mairhanser | F01D 17/162 |
| 2021/0079805 | A1 | 3/2021 | Landry | |
| 2022/0341342 | A1 | 10/2022 | Nauss et al. | |

* cited by examiner

VARIABLE VANE LEVER ARM

BACKGROUND

The disclosure relates to variable lever arms. More particularly, the disclosure relates to vane lever arms such as used for variable vanes of a gas turbine engine.

Gas turbine engines (used in propulsion and power applications and broadly inclusive of turbojets, turboprops, turbofans, turboshafts, industrial gas turbines, and the like) may include variable vane stages in one or more sections of the engine. In a variable vane stage, a circumferential array of vane airfoils are each rotatable about the respective associated axis of rotation. The vane airfoils may each be mounted for such a rotation to an inner diameter (ID) platform/shroud or inner casing and an outer diameter (OD) shroud or outer casing. Vane rotation may be driven by respective lever arms typically mounted to an outer diameter (OD) shaft of the vane.

Example vane lever arms extend between a driving end and a driven end. The driving end includes one or more features for mounting to a driver such as a synchronizing ring. The driven end includes one or more features for mounting to the associated vane OD shaft/stem to rotate said vane about its axis of rotation.

A number of constructions of vane arms exist. U.S. patent Ser. No. 10/161,260B2 (the '260 patent) of Morganti et al., Dec. 25, 2018, entitled "Vane Lever Arm for a Variable Area Vane Arrangement", discloses vane arms formed via bending sheet metal stock. The disclosure of the '260 patent is incorporated by reference in its entirety herein as if set forth at length. The vane may be formed by bending a cut generally T-shaped piece of the sheet stock. The driving end is formed at the end of the leg of the T and has a hole/aperture for accommodating a drive pin engaged by the synchronizing ring. The driven end is formed near the head or intersection of the leg and the arms of the T. Near the head/intersection, the leg has a hole/aperture for receiving a threaded shaft/stem of the vane.

The arms are bent around to overlap. The overlapping one of the arms has an aperture through which the vane shaft/stem passes in the mounted condition. The overlapped arm end protrudes over the overlapping arm aperture. A proximal portion of the vane shaft/stem is clamped by abutting contact of both a proximal edge of the overlapping arm aperture and the overlapped arm distal end.

To install the vane arm of the '260 patent to its associated vane, a tool is used to spread the arms slightly apart to reduce the overlap of the overlapped arm distal end and the overlapping arm aperture. The spreading provides clearance to install with the overlapping arm aperture passing over the threaded distal end portion of the shaft and over a region proximal of the threads having opposite parallel flats. Ultimately, the shaft passes through the head end aperture of the leg allowing a tab washer and nut to be installed and tightened down.

Releasing of the tool allows partial relaxation of the arms to compressively engage the shaft/stem proximal portion flats for registry. The head end hole in the '260 patent is partially circular with a circular arc and a chord providing a flat perimeter surface. In complementary fashion, the shaft threaded end portion has a flat interrupting the threads. The cooperation of the hole flat and shaft flat provides rotational keying to predetermine a single installation orientation of the vane arm relative to the vane.

SUMMARY

One aspect of the disclosure involves a vane arm comprising: a first end and a second end. A shank extends between the first end and the second end and has a first face and a second face. A first hole is in the shank proximate the first end. A second hole in the shank proximate the second end. A first tab projects laterally from the shank proximate the second end and has: a bend; and a distal portion distally of the bend. A second tab projects laterally from the shank proximate the second end laterally opposite the first tab and has: a bend; a distal portion distally of the bend; and a third hole in the second tab distal portion overlapping a distal end edge of the first tab and having a proximal edge and a distal edge. At least along a region across an axis of the second hole, the third hole distal edge and proximal edge diverge from each other in a direction toward the first end and/or the first tab distal end edge and the third hole proximal edge diverge from each other in a direction toward the first end.

In a further embodiment of any of the foregoing embodiments, additionally and/or alternatively, the first tab distal portion is overlapping and spaced apart from and has a face facing the shank second face; and the second tab distal portion is overlapping and spaced apart from and has a face facing the shank second face.

In a further embodiment of any of the foregoing embodiments, additionally and/or alternatively, the first tab distal end edge and the third hole proximal edge diverge from each other in the direction toward the first end by an angle of 10° to 25°.

In a further embodiment of any of the foregoing embodiments, additionally and/or alternatively, the third hole distal edge and proximal edge diverge from each other in the direction toward the first end along a majority of a length of the third hole.

In a further embodiment of any of the foregoing embodiments, additionally and/or alternatively, the third hole distal edge and proximal edge diverge from each other in the direction toward the first end by an angle of 10° to 25°.

In a further embodiment of any of the foregoing embodiments, additionally and/or alternatively, the first, second, and third holes are in a single metallic piece.

In a further embodiment of any of the foregoing embodiments, additionally and/or alternatively, the first, second, and third holes are the only holes in the vane arm.

A further aspect of the disclosure involves a vane assembly including the vane arm and further comprising a vane having an airfoil and a shaft protruding from an end of the airfoil, wherein: the vane shaft extends through the second hole; the vane shaft abuts the third hole proximal edge and the first tab distal end edge; the vane shaft has a shoulder; and a nut holds the vane arm to the shaft compressed between the nut and the shoulder.

In a further embodiment of any of the foregoing embodiments, additionally and/or alternatively, a tab washer is between the nut and the vane arm and has a tab received in an open channel in the second end.

In a further embodiment of any of the foregoing embodiments, additionally and/or alternatively: the vane shaft has a first face abutting the third hole proximal edge; and the vane shaft has a second face abutting the first tab distal end edge.

A further embodiment of any of the foregoing embodiments may additionally and/or alternatively include a pin mounted in and protruding from the first hole.

A further aspect of the disclosure involves a vane stage comprising a plurality of the vane assemblies and further comprising: a synchronizing ring coupled to the vane arms and having an axis; and for each vane assembly one or more bearings mounting the vane for rotation about an axis of the vane wherein, rotation of the synchronizing ring about its axis rotates the vanes about their respective axes.

A further aspect of the disclosure involves a method for using the vane arm, the method comprising: installing the arm to a vane so that a shaft of the vane extending from an end of an airfoil of the vane passes through the third hole and second hole and the vane shaft abuts the third hole proximal edge and the first tab distal end edge; and installing a nut to a threaded portion of the shaft to hold the vane arm to the shaft compressed between the nut and a shoulder of the shaft.

A further embodiment of any of the foregoing embodiments may additionally and/or alternatively include installing a pin to the first hole.

In a further embodiment of any of the foregoing embodiments, additionally and/or alternatively the method is performed with a plurality of vane arms and the respective pins are mounted to a shared synchronizing ring.

A further aspect of the disclosure involves a vane arm having a first end and a second end. A shank extends between the first end and the second end and has a first face and a second face. A first hole is in the shank proximate the first end and a second hole is in the shank proximate the second end. A first tab projects laterally from the shank proximate the second end and has: a bend; and a distal portion distally of the bend. A second tab projects laterally from the shank proximate the second end laterally opposite the first tab and has: a bend; a distal portion distally of the bend and partially overlapping the first tab portion; and a hole in the second tab distal portion overlapping a distal end edge of the first tab. At least along a region across an axis of the second hole, the first tab distal end edge and a proximal edge of the hole provide means for uniquely angularly registering the vane arm to a shaft.

In a further embodiment of any of the foregoing embodiments, additionally and/or alternatively, the first tab distal portion is overlapping and spaced apart from and has a face facing the shank second face; and the second tab distal portion is overlapping and spaced apart from and has a face facing the shank second face.

In a further embodiment of any of the foregoing embodiments, additionally and/or alternatively the means comprises an off-parallel orientation the first tab distal end edge and the proximal edge of the hole.

In a further embodiment of any of the foregoing embodiments, additionally and/or alternatively, the first tab distal end edge and the hole proximal edge diverge from each other in a direction toward the first end by an angle of 10° to 25°.

A further aspect of the disclosure involves a vane assembly having a vane and a vane arm. The vane has an airfoil and a shaft protruding from an end of the airfoil, the shaft having: a threaded portion; a shoulder; and a first facet and a second facet between the shoulder and the threaded portion. The vane arm has: a first end and a second end; a shank extending between the first end and the second end and having a first face and a second face; a first hole in the shank proximate the first end; a second hole in the shank proximate the second end, the shaft in the second hole; and first and second tabs. The first tab projects laterally from the shank proximate the second end and has: a bend; and a distal portion distally of the bend and having a distal edge contacting the second facet. The second tab projects laterally from the shank proximate the second end laterally opposite the first tab and has: a bend; a distal portion distally of the bend and partially overlapping the first tab portion; and a hole in the second tab distal portion having a proximal edge contacting the first facet. A nut holds the vane arm to the shaft compressed between the nut and the shoulder. In cross-section normal to an axis of the threads of the threaded portion, the first and second facets are off-parallel to each other.

In a further embodiment of any of the foregoing embodiments, additionally and/or alternatively, the first tab distal portion is overlapping and spaced apart from and has a face facing the shank second face; and the second tab distal portion is overlapping and spaced apart from and has a face facing the shank second face.

In a further embodiment of any of the foregoing embodiments, additionally and/or alternatively in said cross-section normal to the axis of the threads of the threaded portion, the first and second facets are off-parallel to each other by an angle of 10° to 25°.

In a further embodiment of any of the foregoing embodiments, additionally and/or alternatively a tab washer is between the nut and the vane arm and has a tab received in an open channel in the second end.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
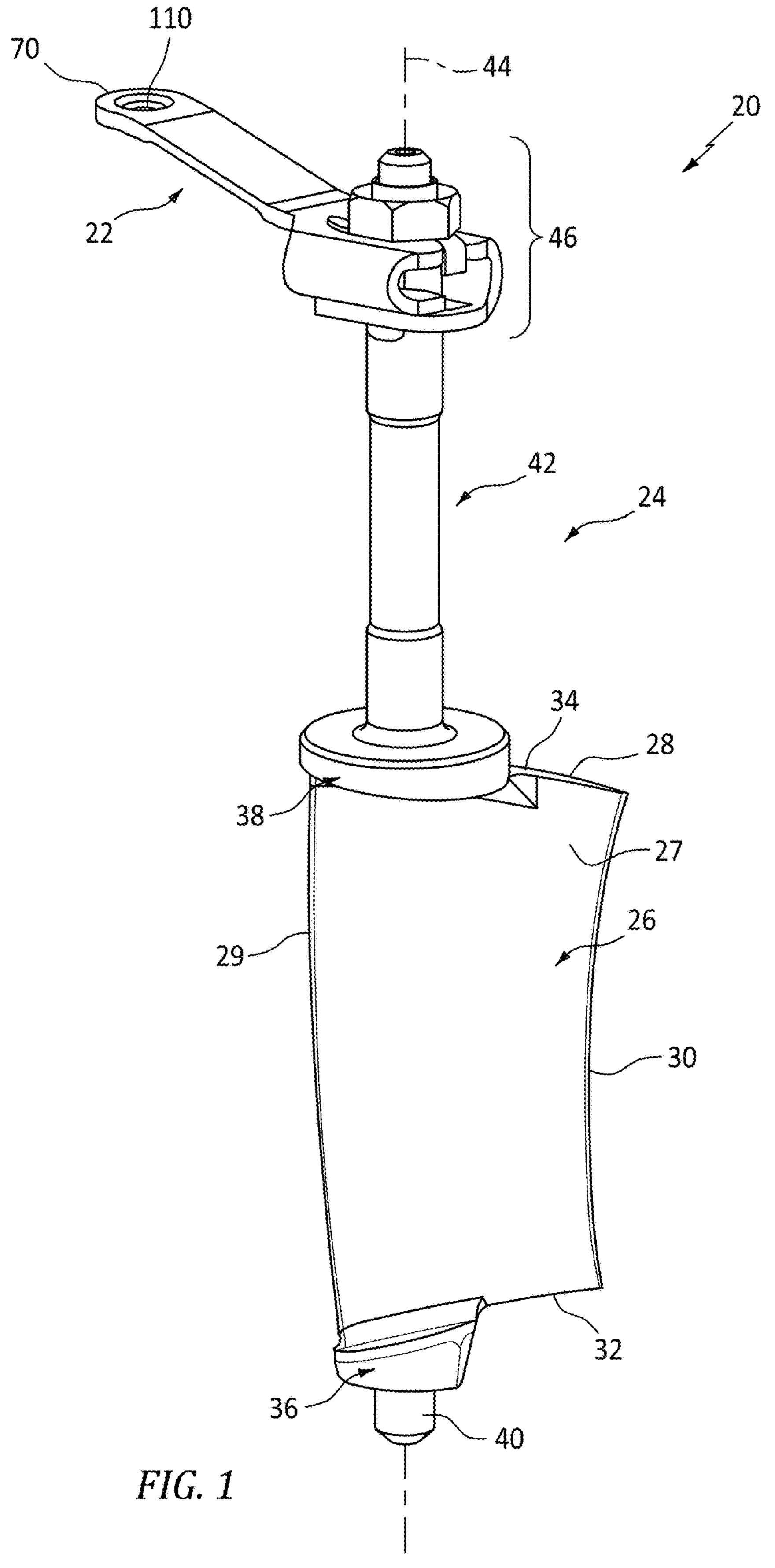
FIG. 1 is a view of a vane assembly.

FIG. 1 shows a vane assembly 20 including vane arm 22 and vane 24 configured as a modification of the baseline of the ’260 patent. The vane 24 includes an airfoil 26 having a pressure side 27, a suction side 28, a leading edge 29, and a trailing edge 30. The airfoil extends along a span from an inner diameter (ID) end 32 to an outer diameter (OD) end 34. Such ID and OD are measured essentially relative to the engine centerline. The airfoil ID and OD ends respectively merge, along forward/leading portions thereof, with respective ID and OD platforms 36 and 38. Respectively inward and outward from the platforms 36 and 38 are an ID shaft 40 and an OD shaft 42. The shafts are coaxial along a vane axis 44 which forms an axis of rotation and axis of threads of a threaded portion 50 discussed below. The OD shaft 42 includes a distal mounting section 46 for mating with the vane arm 22.

Figure 2:
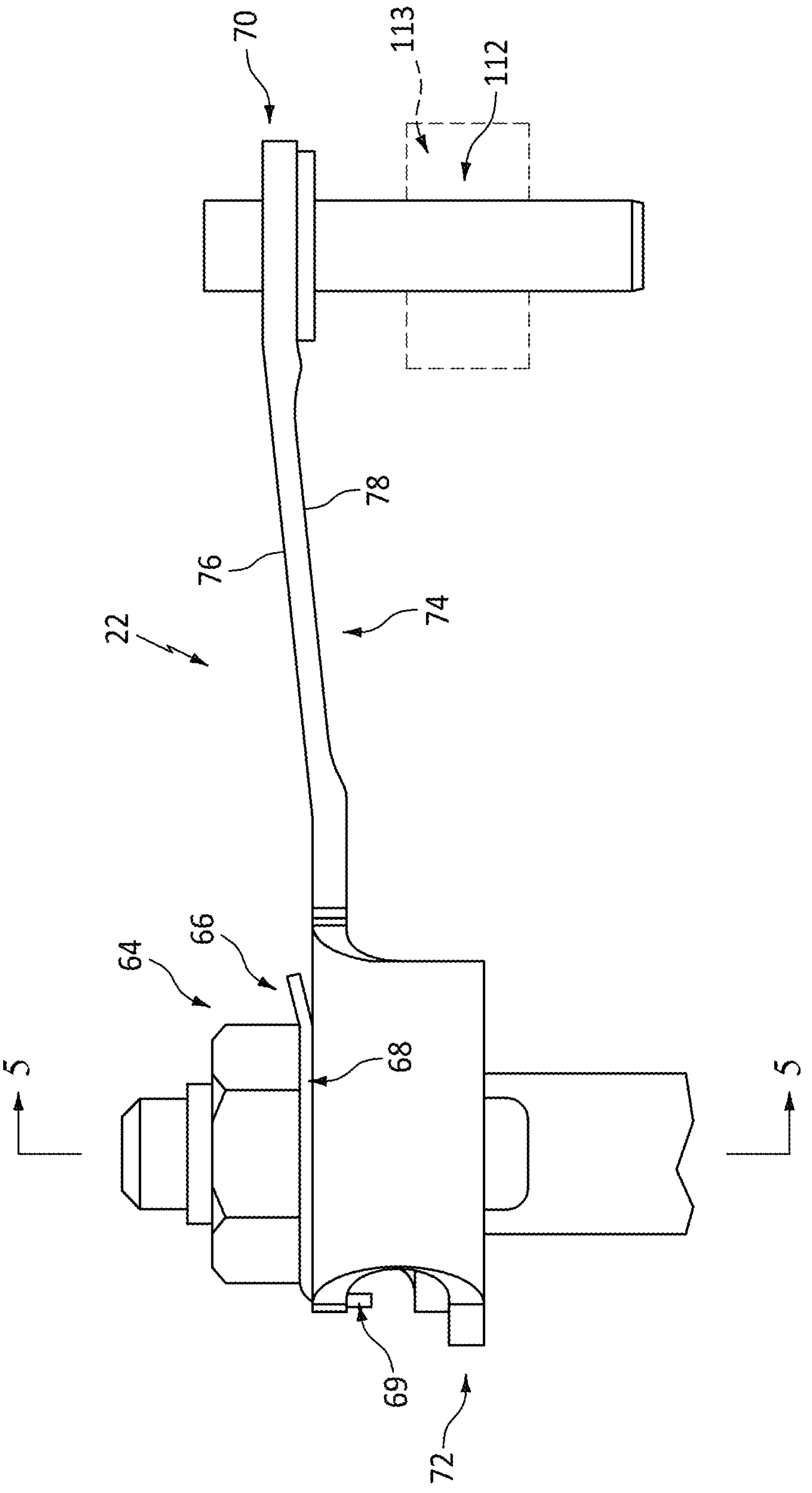
FIG. 2 is a side view of the vane arm region.
Figure 4:
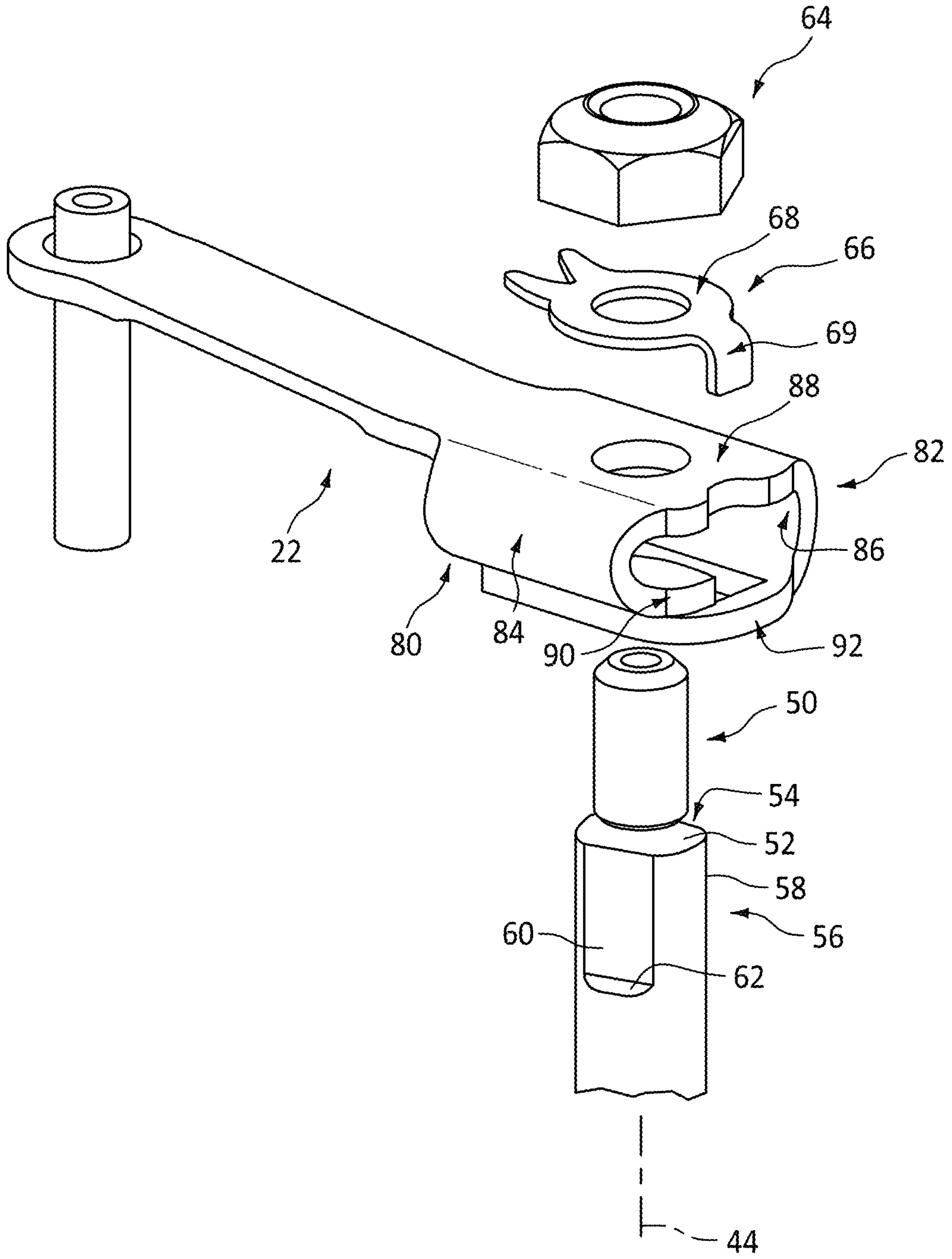
FIG. 4 is an exploded view of the vane arm region.

The mounting section 46 includes an externally threaded section/region/portion 50 (FIG. 4) with a shoulder surface 52 radially inward thereof or proximal relative to the airfoil. The shoulder 52 is separated from the threaded section by a necked region 54. Below/inward of the shoulder is a faceted section 56 having opposed first 58 and second 60 faces or facets. These facets extend, along a substantial majority of their axial lengths parallel to the axis 44 with a fillet 62 to an intact circular section of the shaft. FIG. 2 also shows a nut 64 installed to the threaded section and a tab washer 66 between the nut and the arm. The tab washer has an annular body 68 and a tab 69 bent at an angle thereto.

Figure 3:
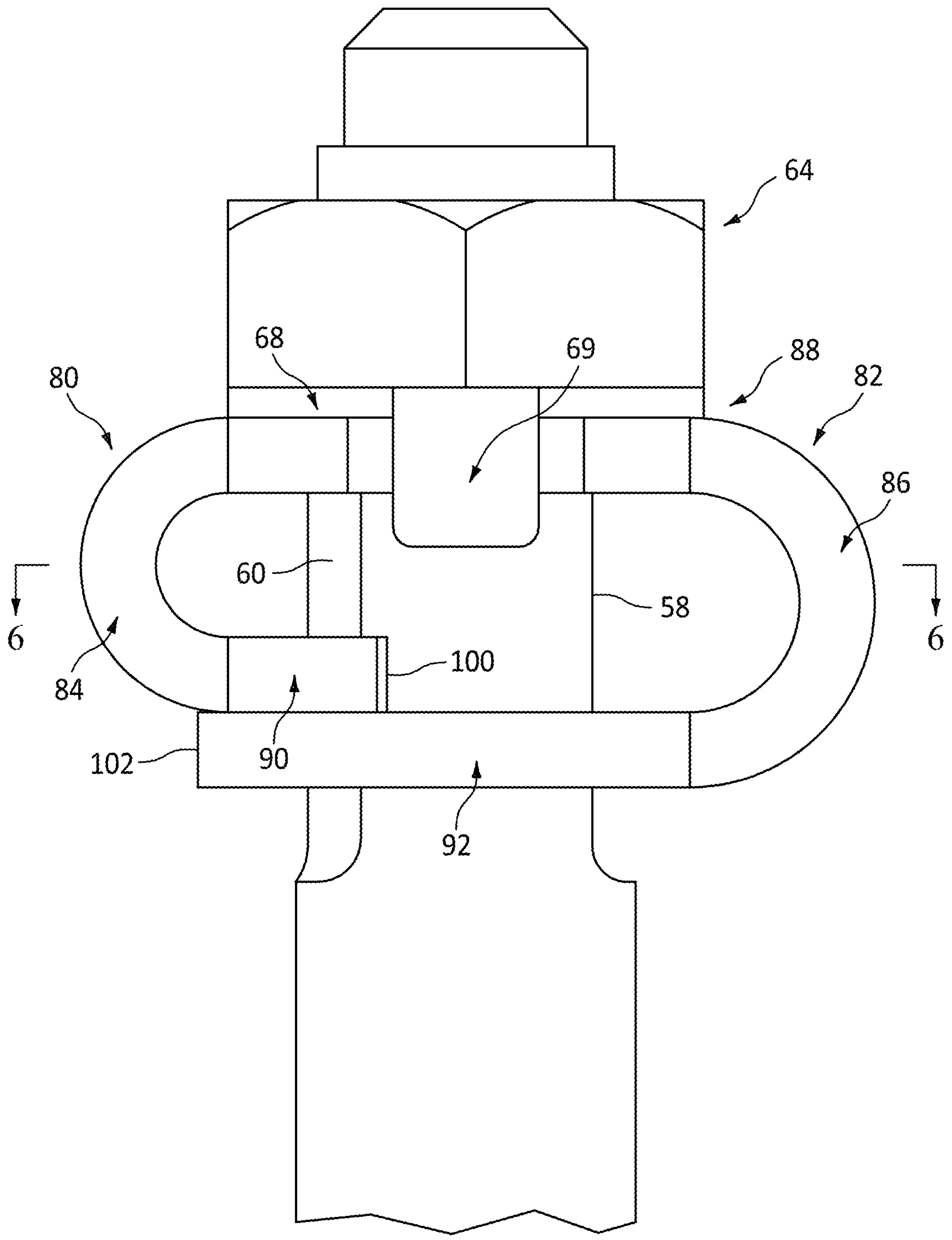
FIG. 3 is an end view of the vane arm region.

The arm 22 (FIG. 2) extends generally from a first end 70 to a second end 72. In this example, the first end 70 is a driving end and the second end 72 is a driven end. The example arm 22 is formed from stamped/bent sheet metal stock (e.g., nickel-based alloy/superalloy such as AMS 5596-UNS N07718 (nominal 52.5Ni-19Cr-3.0Mo-5.1Cb (Nb)-0.90Ti-0.50Al-18Fe)). The arm 22 has a shank 74 extending between the first end and the second end and having a first face 76 and a second face 78. These faces 76 and 78 may correspond to faces of the sheet stock or relieved portions thereof. In the example, a portion of the second face 78 is relieved relative to the original sheet stock for lightening. In an example method of manufacture, the stamped sheet stock piece may have an initial cut form of a generally T-like planform/footprint with the first end 70 being the lower end of the leg of the T. The arms of the T form respective tabs projecting laterally from the shank proximate the second end. FIG. 3 shows the arms/tabs 80 and 82 in their bent configurations with bends 84, 86, respectively extending from a second end portion 88 of the shank to respective distal portions 90, 92 of the arms 80 and 82 (distally of the respective bends 84 and 86). Example bends have the effect of forming an essentially 180-degree U-turn.

The bends 84, 86 are such that the respective distal portions 90, 92 have faces facing the shank second face 78. These faces may be formed from the same face of original stock as the second face 78. The distal portions overlap the shank (i.e., a line through the shank perpendicular to the faces 76, 78 also intersects the distal portions) and are spaced apart therefrom. The bend 84 is of tighter curvature than the bend 82 to allow the distal portion 92 to overlap the distal portion 90 (i.e., the distal portion 90 is between the distal portion 92 and the shank). The tabs extend to respective distal ends 100, 102.

Figure 1A:
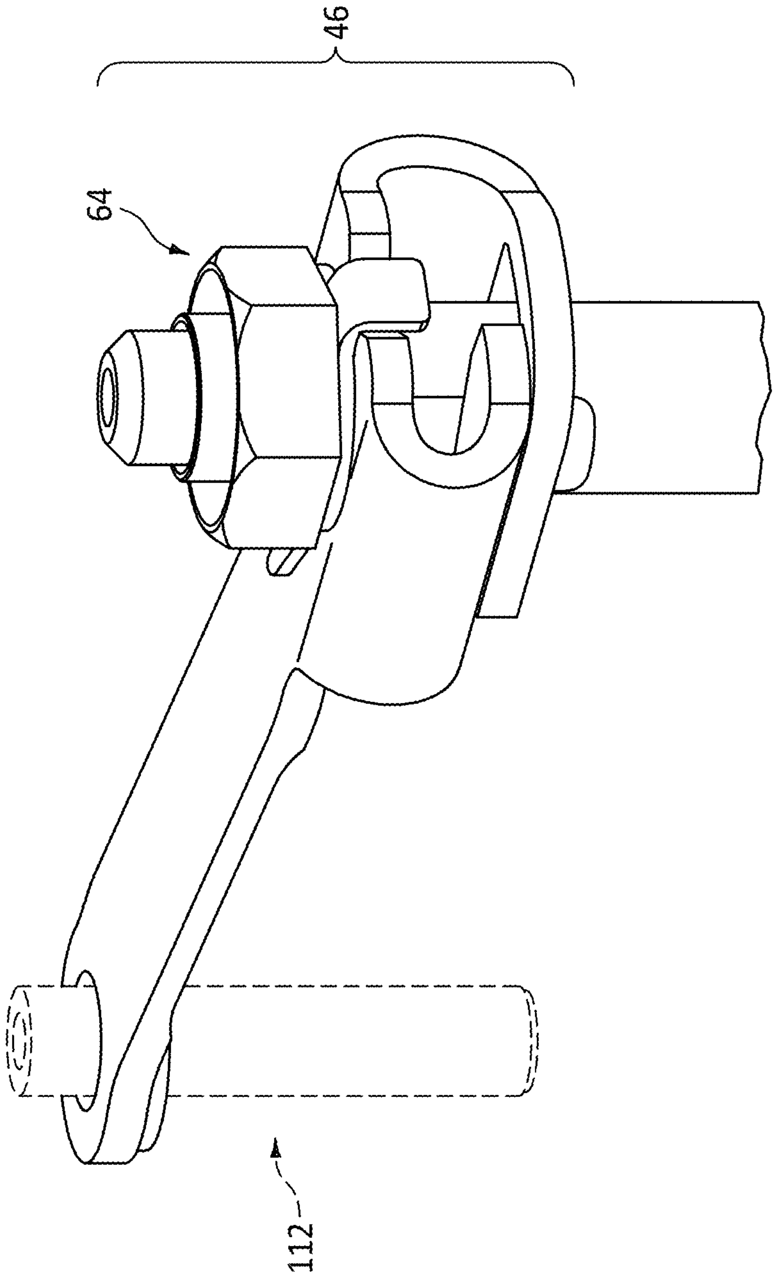
FIG. 1A is an enlarged view of a vane actuating arm region of the assembly of FIG. 1.
Figure 7:
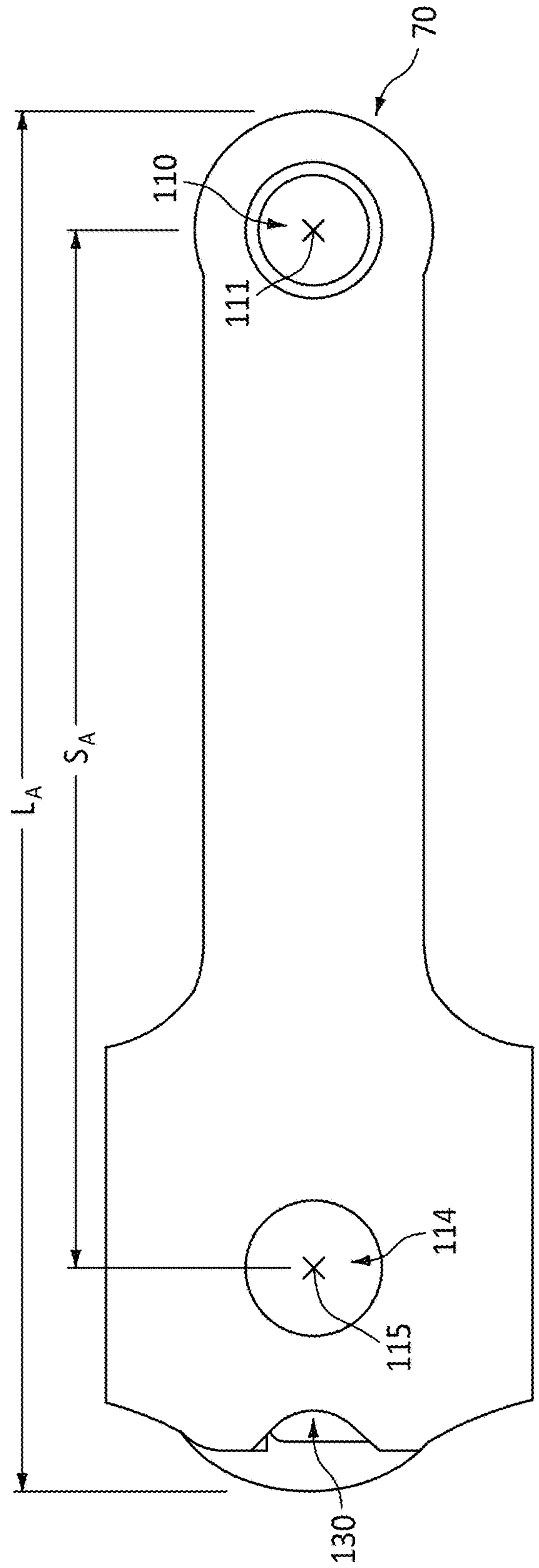
FIG. 7 is an OD face view of a vane arm of the assembly.
Figure 8:
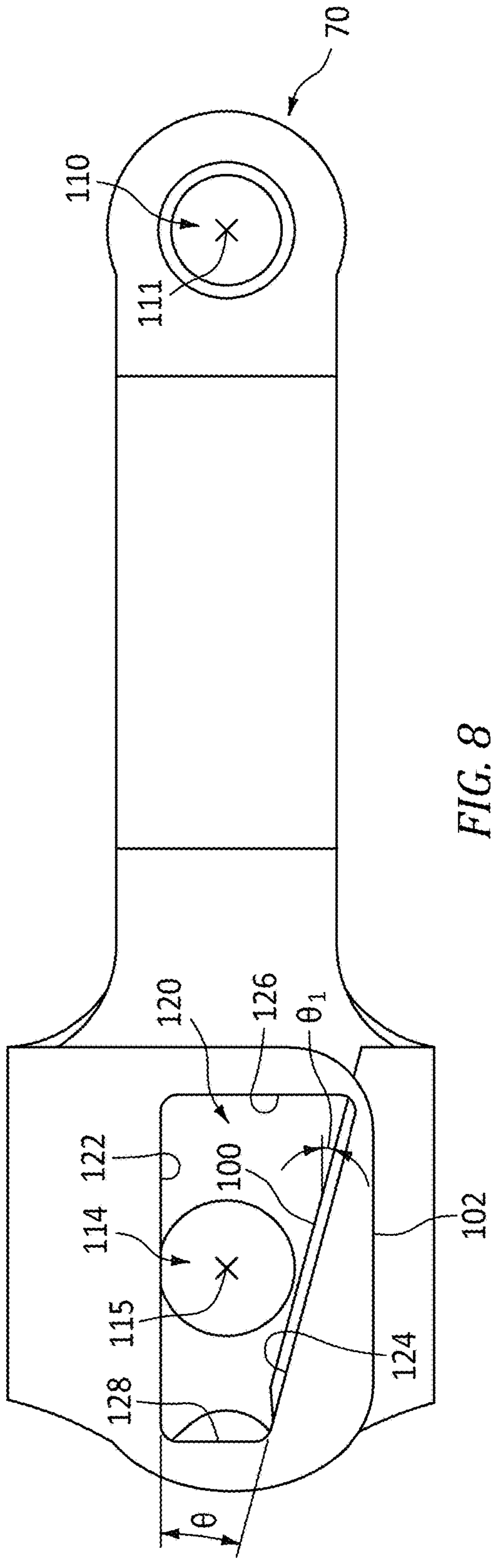
FIG. 8 is an inner diameter (ID) view of the vane arm.

The example vane arm has exactly three through-holes. A first through-hole 110 (FIGS. 7&8) is adjacent the first end 70 for receiving a driving pin 112 (FIGS. 1A&2) which, in turn, is mounted to a synchronizing ring 113 (FIG. 2) in common with the pins of the other vanes of the stage and sharing a central longitudinal axis with the engine and the vane stage. A second through-hole 114 is near the second end and receives the OD shaft 42. The example second hole 114 is of circular cross-section dimensioned to just accommodate the threaded section 50 and allow the adjacent portion of the surface 78 to rest atop the shoulder surface 52. The hole 110 has an axis 111 shared with the pin 112. The second hole 114 has an axis 115 coaxial with the axis 44 in a mounted condition. An example hole-to hole on-center distance or separation $S_A$ (FIG. 7) is about 1.5 inch (38 mm), more broadly 25 mm to 51 mm or 37 mm to 43 mm. An example overall length $L_A$ is about 1.7 inch (43 mm), more broadly 30 mm to 80 mm or 35 mm to 60 mm.

A third hole 120 (FIG. 8) is formed in the distal portion 92 of the second tab 82. The third hole 120 is formed as a rounded-corner trapezoid (shown as a right trapezoid) having a proximal edge 122, a distal edge 124 and end edges 126 and 128. The example edge 126 is longer than the edge 128 and parallel thereto excepting concave transitions at the corners noted above. This leaves the edges 122 and 124 at an angle θ relative to each other. Example θ is about 15°, more generally 120 to 170 or 10° to 25°, diverging in a direction toward the first end 70. The distal edge 100 of the first tab is generally parallel to the distal edge 124 of the third hole. In the relaxed condition of the arm, the third hole is partially overlapped or overlaps the first tab distal portion 90.

Figure 6:
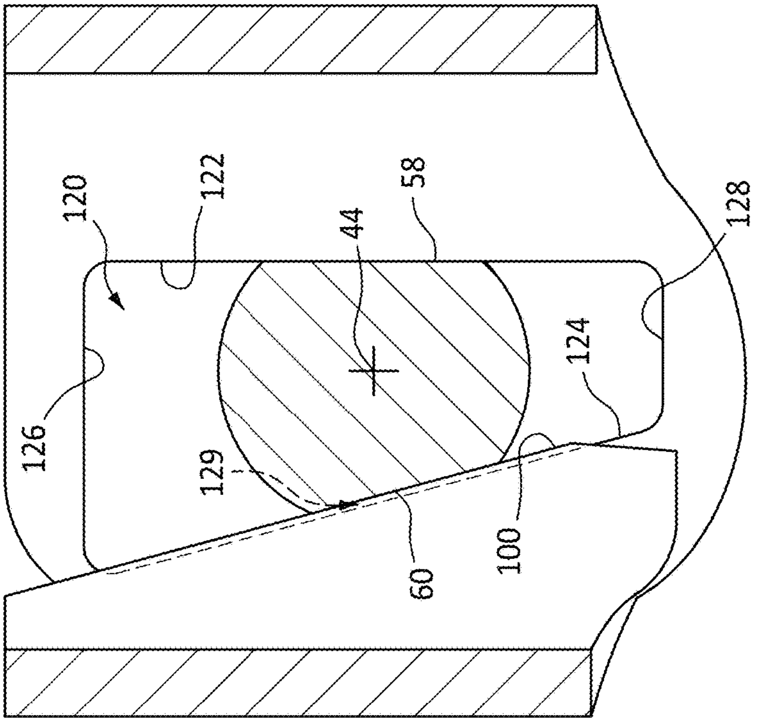
FIG. 6 is a sectional view of the vane arm region taken along line 6-6 of FIG. 3.
Figure 5:
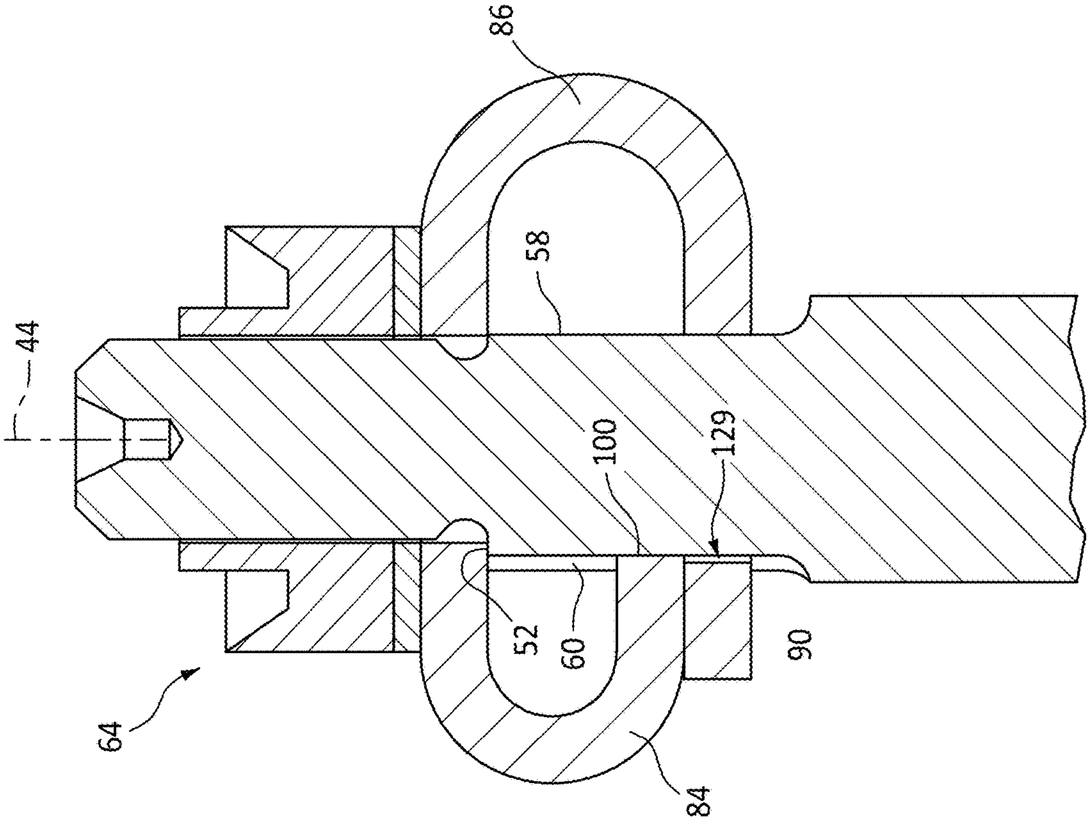
FIG. 5 is a sectional view of the vane arm region taken along line 5-5 of FIG. 2.
Figure 10:
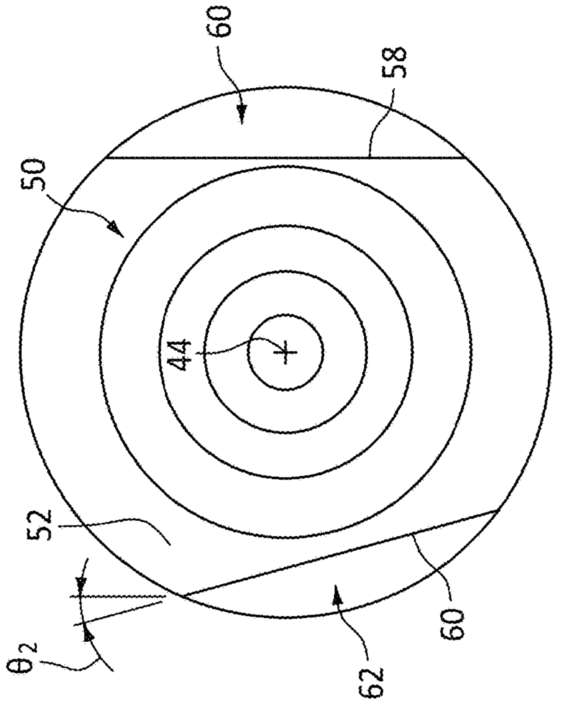
FIG. 10 is an outer diameter (OD) view of a distal end of the shaft section of FIG. 9.
Figure 9:
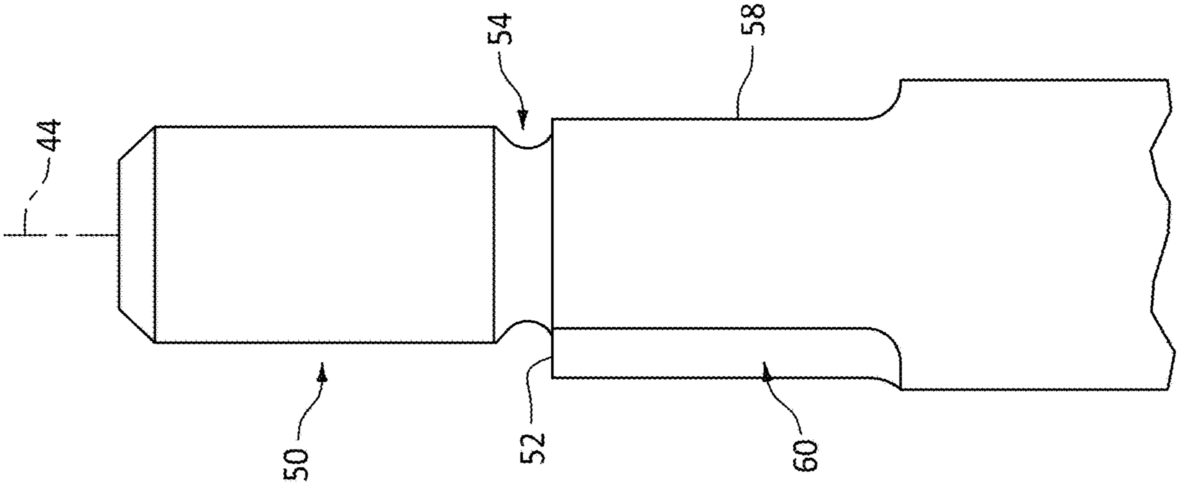
FIG. 9 is a front view of an outer diameter (OD) shaft section of the vane of the assembly.

The example edges 100 and 122 are at an angle to each other shown as $\theta_1$ which may be essentially identical to θ. Yet similarly, the facets 58, 60 of the shaft may be at an angle $\theta_2$ (FIG. 10) also essentially the same. In the properly installed condition, the arm end 100 (FIGS. 5 and 6) is in contact with the facet 60 and the hole 120 proximal edge 122 is in contact with the facet 58. There may be a slight gap 129 between the hole 120 distal edge 124 and the facet 60. Any to all of the aforementioned angles may exist over the majorities of the lateral contact areas at either or both facets 58, 60 or at least 90%.

The modification relative to the '260 patent shifts the keying function from the head end hole of the leg of the T to the arms of the T. This keying is achieved by having a non-zero $\theta_1$ angle between the distal end of the overlapped arm and the opposite edge of the elongate aperture in the overlapping arm. This is in distinction to a zero θ potentially allowing two alternative installation orientations 1800 from each other. If the arm is installed 1800 misoriented about the axis 44, a relatively narrow portion of the hole 120 will align with a relatively broad portion of the shoulder 52 to block the shoulder from passing through the hole.

With keying provided by the arms/tabs, the keying function may be removed from the threaded portion of the shaft and the head end hole. Thus, the head end hole 114 may be circular in footprint and the shaft threads may be uninterrupted. Thus, in the illustrated example, the tab 69 of the tab washer 66 is not received by a fourth hole between the first and second holes. Instead, it is received in an open distal end channel 130 (FIG. 7) of the leg of the T (e.g., the head thereof). Thus, the omission of that fourth hole allows strengthening of the shaft or weight reduction at a given strength.

Relative to the baseline, such modification may offer one or more of several advantages. The head end hole 114 may be easier to form (e.g., drill) as a pure circle relative to the baseline hole having a flat. The step of grinding the baseline shaft flat (that keys with the baseline hole flat) may be eliminated as may be any thread dressing or touch up required by pre-forming or post-forming the shaft flat. Keying may be improved, particularly with greater angles θ. Notably, whereas a parallel interaction of the arms with the vane shaft would potentially offer two equivalent keying orientations, the angled configuration may limit to a single keying orientation.

Component materials and manufacture techniques and assembly techniques may be otherwise conventional. This may involve stamping/machining/press braking from plate stock.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline vane arm configuration, details of such baseline may influence details of particular implementations. Accordingly, other embodiments are within the scope of the following claims.

What is claimed is:

1. A vane arm comprising:
a first end and a second end;
a shank extending between the first end and the second end and having a first face and a second face;
a first hole in the shank proximate the first end;
a second hole in the shank proximate the second end;
a first tab projecting laterally from the shank proximate the second end and having:
a bend; and
a distal portion distally of the bend; and
a second tab projecting laterally from the shank proximate the second end laterally opposite the first tab and having:
a bend;
a distal portion distally of the bend and partially overlapping the first tab distal portion; and
a third hole in the second tab distal portion overlapping a distal end edge of the first tab and having a proximal edge and a distal edge,
wherein at least along a region across an axis of the second hole:
the third hole distal edge and proximal edge diverge from each other in a direction toward the first end; and/or
the first tab distal end edge and the third hole proximal edge diverge from each other in a direction toward the first end.

2. The vane arm of claim 1 wherein:
the first tab distal end edge and the third hole proximal edge diverge from each other in the direction toward the first end by an angle of 10° to 25°.

3. The vane arm of claim 2 wherein:
the third hole distal edge and proximal edge diverge from each other in the direction toward the first end along a majority of a length of the third hole.

4. The vane arm of claim 3 wherein:
the third hole distal edge and proximal edge diverge from each other in the direction toward the first end by an angle of 10° to 25°.

5. The vane arm of claim 4 wherein:
the first, second, and third holes are in a single metallic piece.

6. The vane arm of claim 5 wherein:
the first, second, and third holes are the only holes in the vane arm.

7. A vane assembly including the vane arm of claim 1 and further comprising a vane having an airfoil and a shaft protruding from an end of the airfoil, wherein:
the vane shaft extends through the second hole;
the vane shaft abuts the third hole proximal edge and the first tab distal end edge;
the vane shaft has a shoulder; and
a nut holds the vane arm to the shaft compressed between the nut and the shoulder.

8. The vane assembly of claim 7 wherein:
a tab washer is between the nut and the vane arm and has a tab received in an open channel in the second end.

9. The vane assembly of claim 7 wherein:
the vane shaft has a first face abutting the third hole proximal edge; and
the vane shaft has a second face abutting the first tab distal end edge.

10. The vane assembly of claim 9 further comprising:
a pin mounted in and protruding from the first hole.

11. A vane stage comprising a plurality of vane assemblies of claim 7 and further comprising:
a synchronizing ring coupled to the vane arms and having an axis; and
for each vane assembly one or more bearings mounting the vane for rotation about an axis of the vane wherein, rotation of the synchronizing ring about its axis rotates the vanes about their respective axes.

12. A method for using the vane arm of claim 1, the method comprising:
installing the arm to a vane so that:
a shaft of the vane extending from an end of an airfoil of the vane passes through the third hole and second hole; and
the vane shaft abuts the third hole proximal edge and the first tab distal end edge; and
installing a nut to a threaded portion of the shaft to hold the vane arm to the shaft compressed between the nut and a shoulder of the shaft.

13. The method of claim 12 further comprising:
installing a pin to the first hole.

14. The method of claim 13 wherein:
the method is performed with a plurality of vane arms and the respective pins are mounted to a shared synchronizing ring.

15. The vane arm of claim 1 wherein:
the third hole distal edge and proximal edge diverge from each other in the direction toward the first end along a majority of a length of the third hole.

16. The vane arm of claim 15 wherein:
the third hole distal edge and proximal edge diverge from each other in the direction toward the first end by an angle of 10° to 25°.

17. The vane arm of claim 15 wherein:
the first, second, and third holes are in a single metallic piece.

18. The vane arm of claim 1 wherein:
the third hole distal edge and proximal edge diverge from each other in the direction toward the first end by an angle of 10° to 25°.

19. The vane arm of claim 1 wherein:
the first, second, and third holes are in a single metallic piece.

20. The vane arm of claim 1 wherein:
the first, second, and third holes are the only holes in the vane arm.

* * * * *